United States Patent
Tobinaga

(10) Patent No.: US 11,539,849 B2
(45) Date of Patent: Dec. 27, 2022

(54) IMAGE FORMING APPARATUS CAPABLE OF TURNING OFF POWER UPON DETECTION OF PREDETERMINED GESTURE

(71) Applicant: KYOCERA Document Solutions Inc., Osaka (JP)

(72) Inventor: Masayuki Tobinaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/667,469

(22) Filed: Feb. 8, 2022

(65) Prior Publication Data

US 2022/0263956 A1 Aug. 18, 2022

(30) Foreign Application Priority Data

Feb. 18, 2021 (JP) .............................. JP2021-024509

(51) Int. Cl.
*H04N 1/00* (2006.01)

(52) U.S. Cl.
CPC ..... *H04N 1/00381* (2013.01); *H04N 1/00037* (2013.01); *H04N 1/00076* (2013.01); *H04N 1/00087* (2013.01); *H04N 1/00408* (2013.01)

(58) Field of Classification Search
CPC ................................................ H04N 1/00381
USPC .......................................................... 358/1.15
See application file for complete search history.

(56) References Cited

U.S. PATENT DOCUMENTS

| 2016/0179292 | A1* | 6/2016 | Fujimoto | G06F 3/04883 345/175 |
| 2019/0235607 | A1 | 8/2019 | Hachinoda | |
| 2022/0294918 | A1* | 9/2022 | Kyogoku | H04N 1/00392 |

FOREIGN PATENT DOCUMENTS

JP 2019133527 A 8/2019

\* cited by examiner

*Primary Examiner* — Jacky X Zheng
(74) *Attorney, Agent, or Firm* — IP Business Solutions, LLC

(57) ABSTRACT

An image forming apparatus includes a display device, a gesture sensor, and a control device. The control device functions as a controller. When the gesture sensor detects a first gesture, the controller sets the image forming apparatus to a suspend mode and starts counting a first time. When the first time reaches a first threshold value, the controller sets the image forming apparatus to a waiting mode and allows the display device to display a notification indicating the waiting mode. When the gesture sensor detects a second gesture while the notification is displayed, the controller starts counting a second time. When the second time reaches a second threshold value, the controller turns off power of the image forming apparatus.

10 Claims, 10 Drawing Sheets

H2

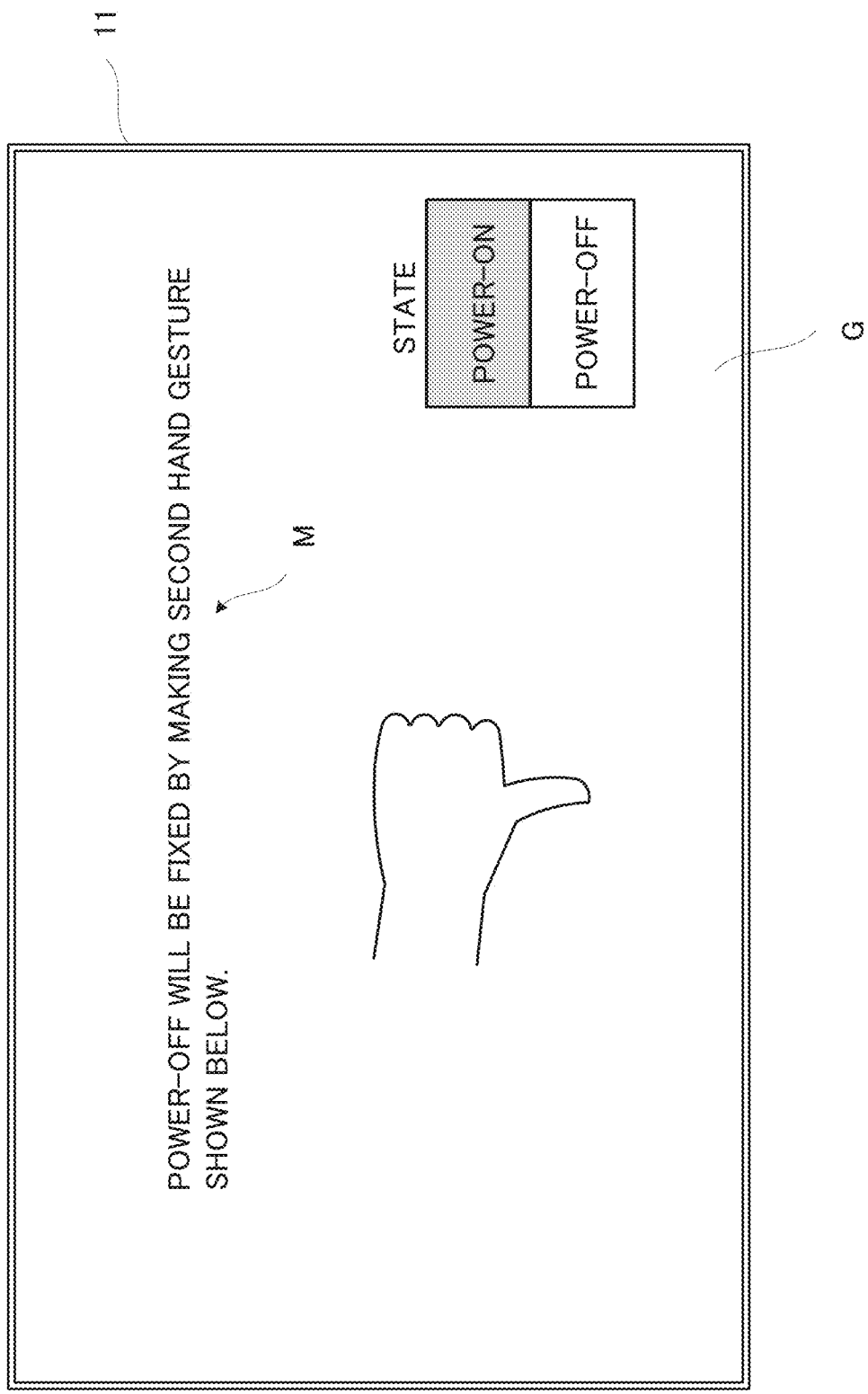

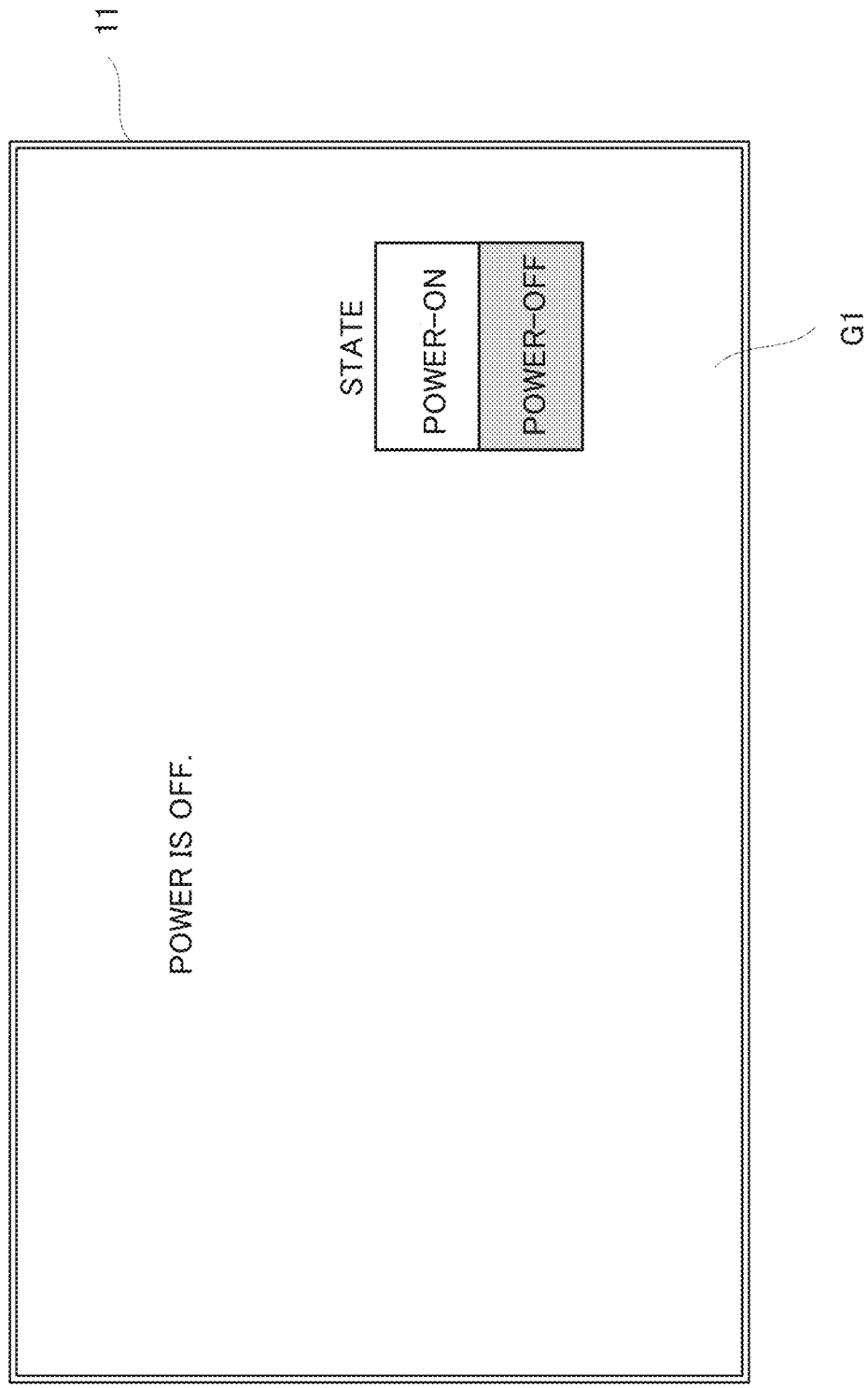

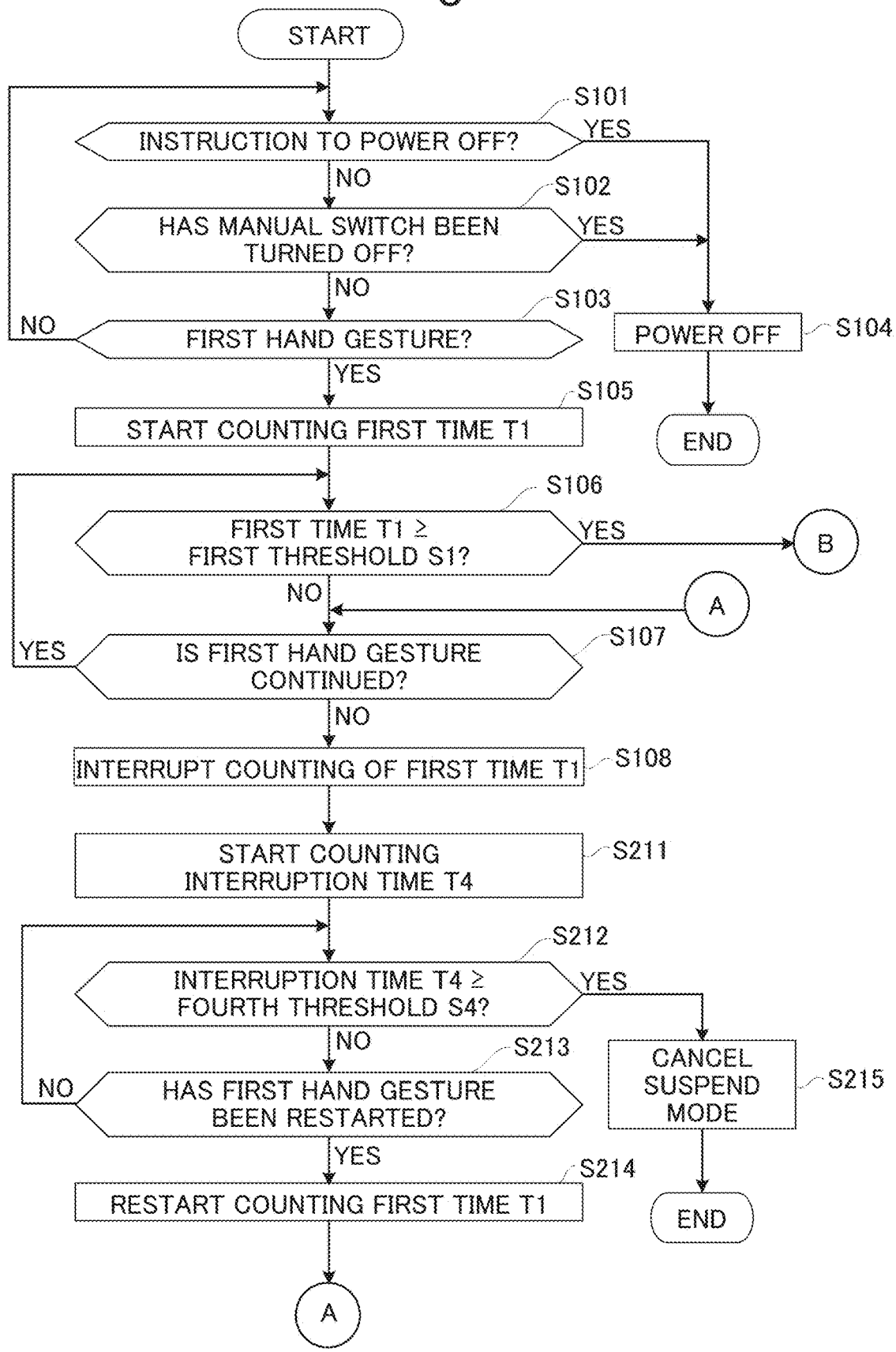

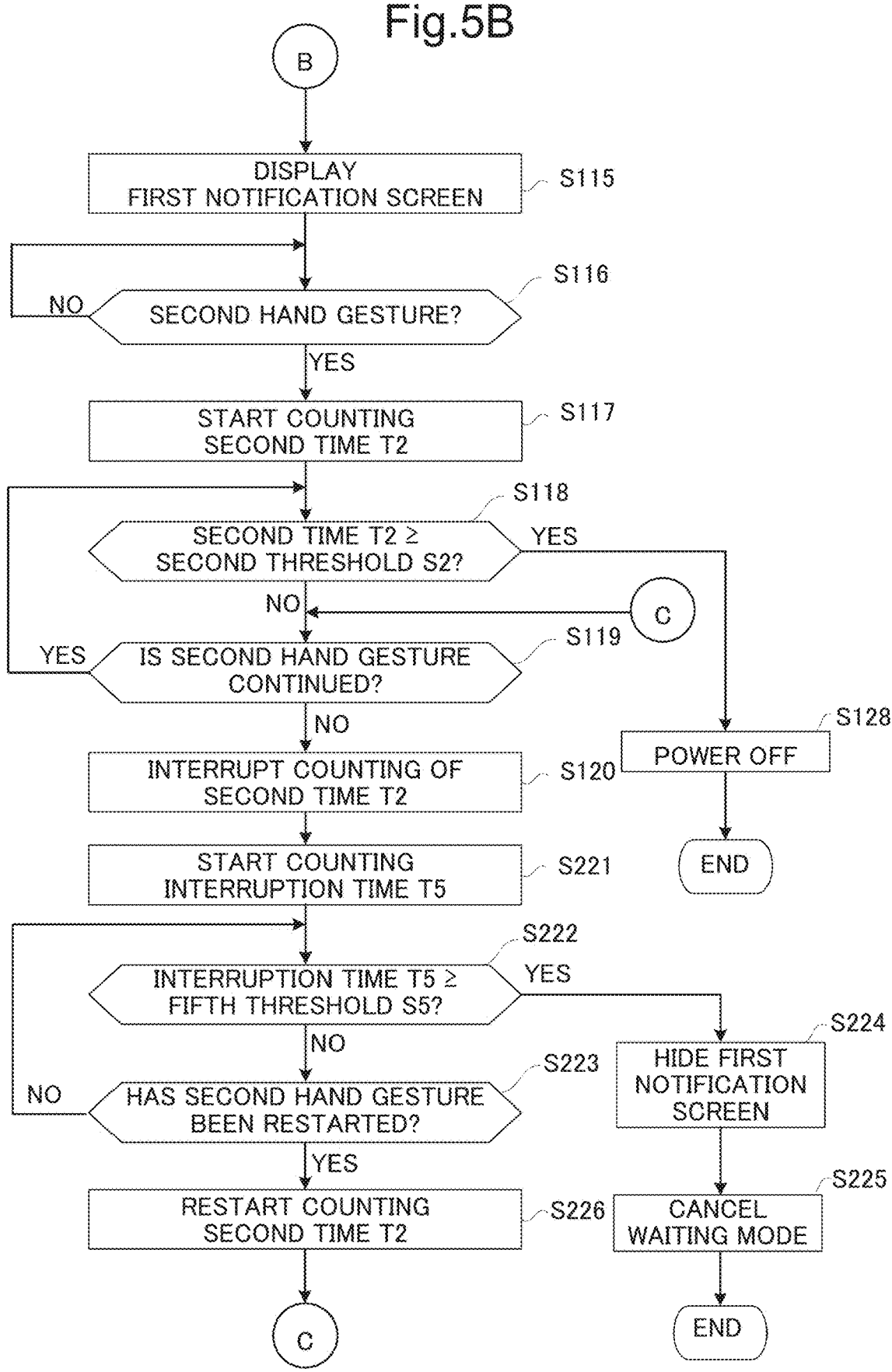

IMAGE FORMING APPARATUS CAPABLE OF TURNING OFF POWER UPON DETECTION OF PREDETERMINED GESTURE

INCORPORATION BY REFERENCE

This application claims priority to Japanese Patent Application No. 2021-024509 filed on 18 Feb. 2021, the entire contents of which are incorporated by reference herein.

BACKGROUND

The present disclosure relates to image forming apparatuses that form images on recording paper sheets and particularly relates to a technique for turning off the power of an image forming apparatus.

An image forming apparatus includes a power supply device that receives supply of electric power from a commercial power source and supplies the electric power to various devices forming the image forming apparatus.

In order to turn on or off the power of the image forming apparatus, it is necessary to turn on or off a manual power switch located between the commercial power source and the power supply device or make a touch gesture on a power key or the like being displayed on a display device equipped with a touch panel.

Generally, there is known a touch panel-integrated display device that, during display of an image, supplies to a common electrode a counter voltage to a pixel electrode and, during detection of a touch gesture, supplies a drive signal for detecting a touch gesture to the common electrode to read a detection signal. As a technique for realizing low power consumption of such a touch panel-integrated display device in operation, a technique is known in which, upon detection of a touch gesture with a finger while an object coming close to the display screen is detected, an output of a control signal for detecting a touch gesture with a pen is stopped and, upon detection of a touch gesture with a pen while the object coming close to the display screen is detected, an output of a control signal for detecting a touch gesture with a finger is stopped.

SUMMARY

A technique improved over the aforementioned technique is proposed as one aspect of the present disclosure.

An image forming apparatus according to an aspect of the present disclosure includes a display device, a gesture sensor, and a control device. The gesture sensor detects a gesture of a user. The control device includes a processor and functions as a controller through the processor operating in accordance with a control program. When the gesture sensor detects a predetermined first gesture, the controller sets the image forming apparatus to a suspend mode for suspending transition to a waiting mode for waiting for acceptance of an instruction to turn off power based on a gesture and starts counting a first time. When the first time reaches a predetermined first threshold value, the controller sets the image forming apparatus to the waiting mode and allows the display device to display a notification indicating the waiting mode. When the gesture sensor detects a predetermined second gesture during display of the notification on the display device, the controller starts counting a second time. When the second time reaches a predetermined second threshold value, the controller turns off the power of the image forming apparatus.

BRIEF DESCRIPTION OF THE DRAWINGS

FIG. 4A is a view showing an example of a first notification screen.

FIG. 4B is a view showing an example of a second notification screen.

FIG. 5A is a flowchart showing a modification of the power-off processing.

FIG. 5B is a flowchart showing processing following the processing in FIG. 5A.

DETAILED DESCRIPTION

Figure 1:
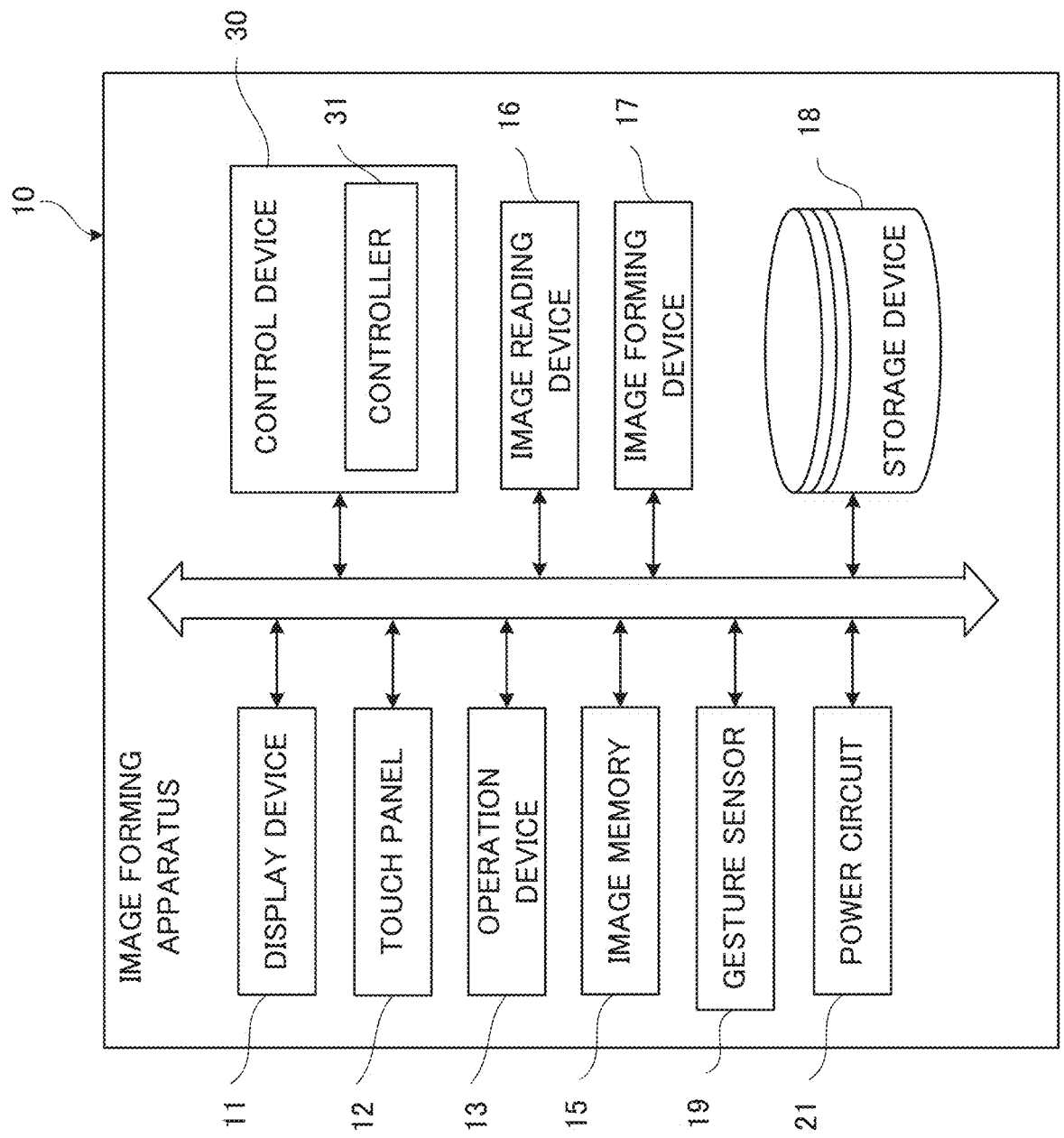
FIG. 1 is a block diagram showing an essential internal configuration of an image forming apparatus.

Hereinafter, a description will be given of an embodiment of the present disclosure with reference to the drawings. FIG. 1 is a block diagram showing an essential internal configuration of an image forming apparatus according to one embodiment of the present disclosure. As shown in FIG. 1, the image forming apparatus 10 according to this embodiment includes a display device 11, a touch panel 12, an operation device 13, an image memory 15, an image reading device 16, an image forming device 17, a storage device 18, a gesture sensor 19, a power circuit 21, and a control device 30. These components are capable of data or signal transfer via a bus among them.

The display device 11 is composed of a liquid crystal display (LCD), an organic EL (an organic light-emitting diode (OLED)) display or the like.

A touch panel 12 is disposed on top of the screen of the display device 11. The touch panel 12 is a touch panel of a resistive film system, a capacitance system or so on. The touch panel 12 detects a touch of the touch panel 12 with a user's finger or the like, together with the point of touch, and outputs a detection signal indicating the coordinate of the point of touch to the control device 30. Thus, through the touch panel 12, an operation on a GUI (graphical user interface) being displayed on the screen of the display device 11 can be implemented. The touch panel 12 functions as an operation device through which a user's operation made on the screen of the display device 11 is input.

The operation device 13 includes physical keys, including numeric keys, an Enter key, and a Start key.

The image reading device 16 includes a scanner that optically reads an image of an original document placed on an original glass plate. The image reading device 16 generates image data representing the image of the original document. The generated image data is stored in the image memory 15.

The image forming device 17 includes a photosensitive drum, a charging device that uniformly charges the surface of the photosensitive drum, an exposure device that exposes the surface of the photosensitive drum with light to form an electrostatic latent image on the surface of the photosensitive drum, a developing device that develops the electrostatic latent image on the surface of the photosensitive drum into a toner image, a transfer device that transfers the toner image (the image) on the surface of the photosensitive drum to a recording paper sheet serving as a recording medium, and so on. The image forming device 17 prints on the recording paper sheet the image represented by the image data in the image memory 15.

The gesture sensor (a motion sensor) 19 is formed of a known gesture sensor. The gesture sensor 19 takes an image in front of the image forming apparatus 10. The gesture sensor 19 takes an image of a user standing in front of the image forming apparatus 10, particularly a hand motion of the user, and recognizes the type of a hand gesture of the user from the taken image. The gesture sensor 19 outputs the recognition result to the control device 30. The gesture sensor 19 detects the distance from the gesture sensor 19 to the user and outputs data representing the distance to the control device 30.

The storage device 18 is a large storage device, such as an SSD (solid state drive) or an HDD (hard disk drive). The storage device 18 holds various application programs and various data.

The power circuit 21 is connected to a commercial power supply. The power circuit 21 supplies operating power to each component of the image forming apparatus 1.

The control device 30 includes a processor, a RAM (random access memory), a ROM (read only memory), and so on. The processor is a CPU (central processing unit), an MPU (micro processing unit), an ASIC (application specific integrated circuit) or the like. When a control program stored in the above ROM or the storage device 18 is executed by the above processor, the control device 30 functions as a controller 31.

The controller 31 governs the overall operation control of the image forming apparatus 10. The control device 30 is connected to the display device 11, the touch panel 12, the operation device 13, the image memory 15, the image reading device 16, the image forming device 17, the storage device 18, the gesture sensor 19, the power circuit 21, and so on. The controller 31 performs operation control of these components and signal or data transfer to and from these components.

The controller 31 serves as a processor that executes various types of processing corresponding to operations made on the touch panel 12 and the operation device 13. The controller 31 controls the display operation of the display device 11 and on-off control of the power circuit 21.

When on the image forming apparatus 10 the user places an original document in the image reading device 16 and operates the Start key of the operation device 13 to input an instruction to form an image, the controller 31 accepts and follows the instruction, thus allowing the image reading device 16 to read the image of the original document, allowing the image memory 15 to store image data representing the image of the original document, inputting the image data into the image forming device 17, and allowing the image forming device 17 to form the image of the original document on a recording paper sheet.

In shutting down the image forming apparatus 10 by turning off the power, the user operates the GUI being displayed on the screen of the display device 11 equipped with the touch panel 12 to input an instruction to turn off the power or operates the manual power switch to turn off the power. The controller 31 turns the power circuit 21 off in response to the instruction to turn off the power, thus stopping the supply of operating power from the power circuit 21 to each component of the image forming apparatus 10. Alternatively, power from the commercial power source is shut off by turning the power switch off, so that the supply of operating power to each component of the image forming apparatus 10 is stopped.

When the above-described, general touch panel-integrated display device is applied to an image forming apparatus to turn on or off the power of the image forming apparatus in response to a touch gesture on the display screen, effective power saving of the image forming apparatus can be achieved. However, in the case where the image forming apparatus 10 is used by many and unspecified persons, users may want to avoid inadvertent touch on the touch panel 12 or the power switch from a hygiene viewpoint. In addition, an excessively simple power-off operation of the image forming apparatus 10 may cause a careless shutdown of the image forming apparatus 10. Such an occurrence should be avoided.

As a solution to the above problems, in the image forming apparatus 10 according to this embodiment, when the user makes predetermined first and second hand gestures in a preset procedure, the controller 31 allows the power circuit 21 to turn off the power of the image forming apparatus 10 to stop power supply. When a user's hand gesture recognized by the gesture sensor 19 meets or approximates the first hand gesture, the controller 31 determines the recognized hand gesture as the first hand gesture.

When a hand gesture recognized by the gesture sensor 19 meets or approximates the second hand gesture, the controller 31 determines the recognized hand gesture as the second hand gesture.

When determining that a first time during which the first hand gesture is made has reached a predetermined first threshold value, the controller 31 sets the image forming apparatus 10 to a waiting mode where it waits for an acceptance of an instruction to turn off the power based on a gesture. When determining that, following the first hand gesture, a second time during which the second hand gesture is made has reached a predetermined second threshold value, the controller 31 allows the power circuit 21 to turn off the power. Thus, the user can turn off the power of the image forming apparatus 10 in a non-contact manner by making gestures in a preset procedure.

Furthermore, when interrupting the first hand gesture or the second hand gesture and making a predetermined third hand gesture, the user can cancel the waiting mode.

Specifically, when a hand gesture recognized by the gesture sensor 19 meets or approximates the third hand gesture, the controller 31 determines the recognized hand gesture as the third hand gesture. Then, when determining a third time during which the third hand gesture is made has reached a predetermined third threshold value, the controller 31 cancels the waiting mode.

Figure 2A:
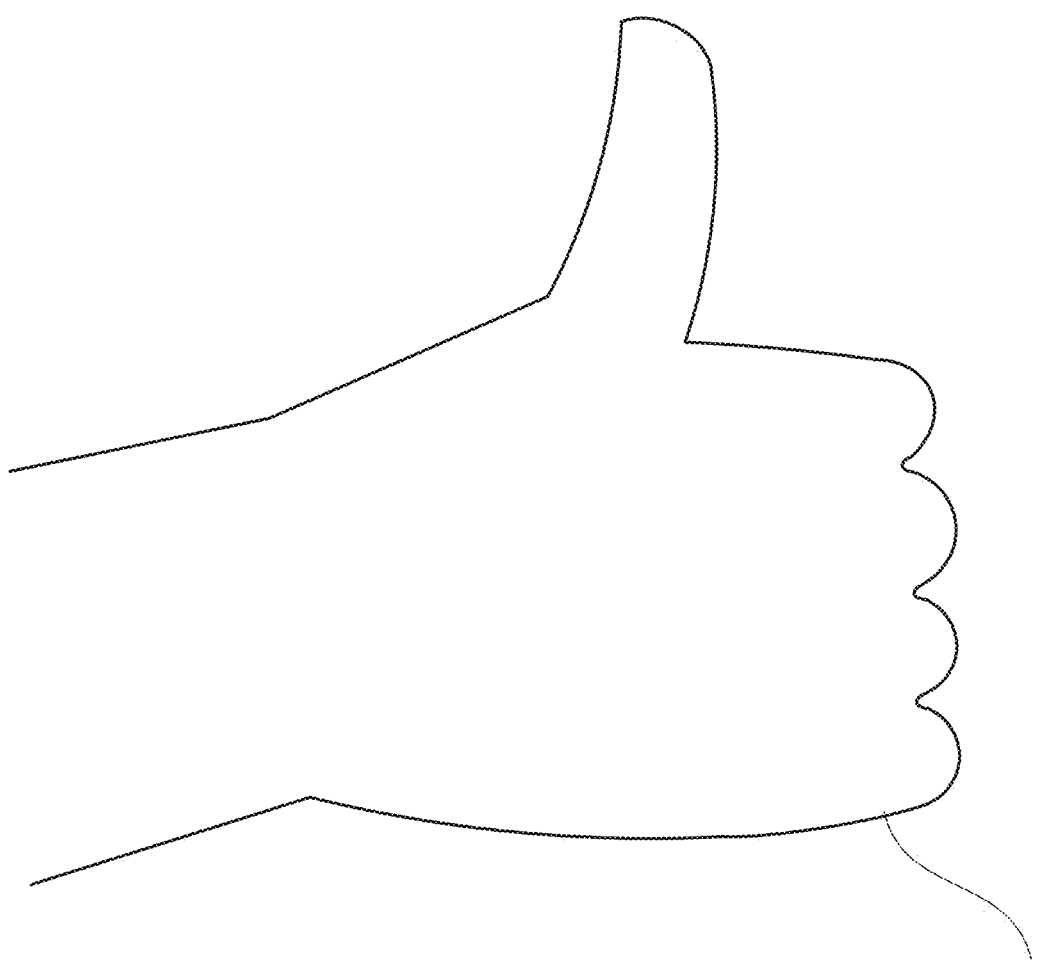
FIG. 2A is a view schematically showing a first hand gesture.
Figure 2B:
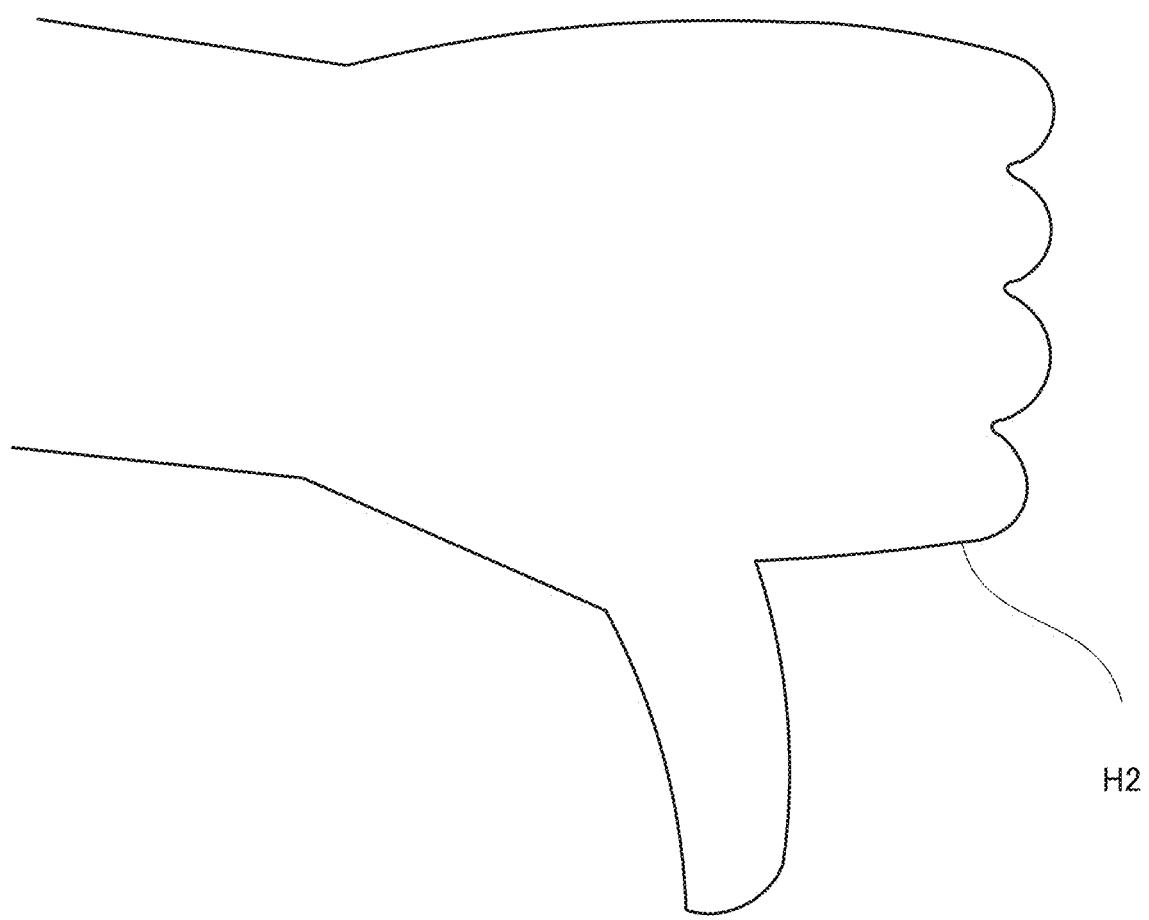
FIG. 2B is a view schematically showing a second hand gesture.
Figure 2C:
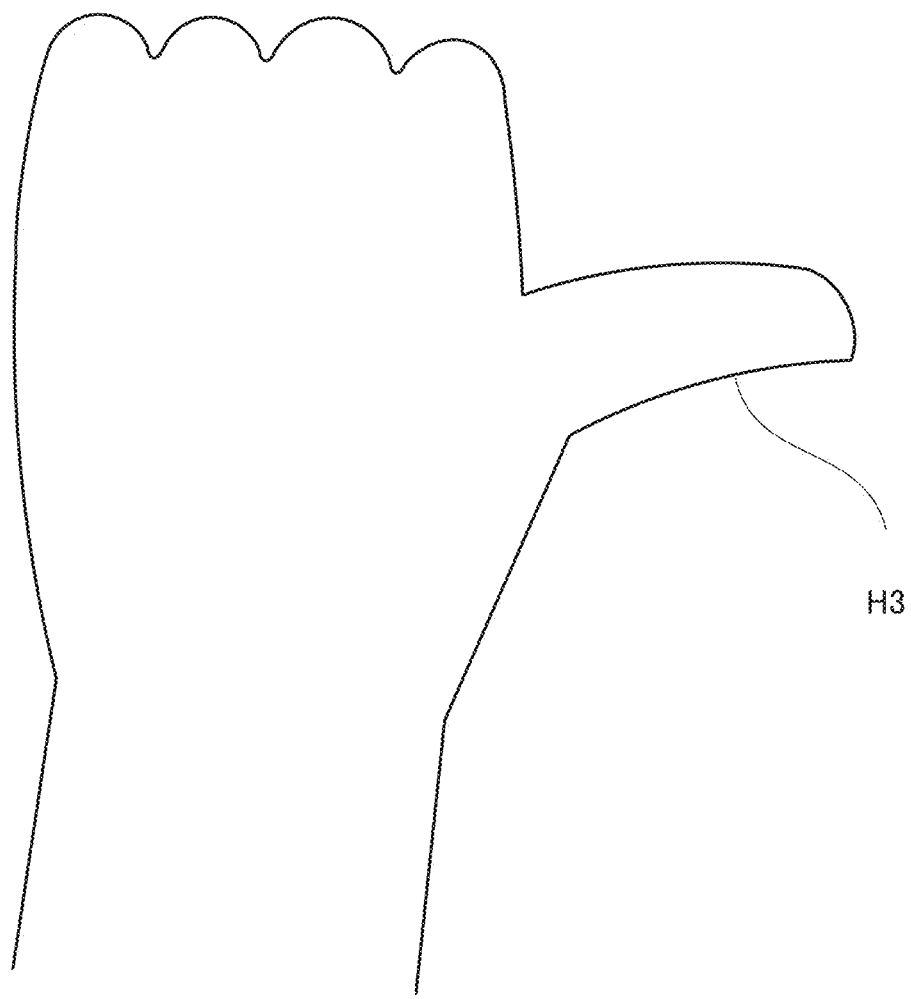
FIG. 2C is a view schematically showing a third hand gesture.

In this relation, for example, suppose that the storage device 18 previously stores data representing a first hand gesture H1 shown in FIG. 2A, data representing a second hand gesture H2 shown in FIG. 2B, and data representing a third hand gesture H3 shown in FIG. 2C. The controller 31 compares, based on a known algorism, data output from the gesture sensor 19 and representing the recognized gesture with the data on each of the hand gestures stored in the storage device 18 and, from this comparison, determines which of the first hand gesture H1, the second hand gesture H2, and the third hand gesture H3 the recognized hand gesture meets or approximates.

The RAM of the control device 30 or the storage device 18 holds the first threshold value, the second threshold value, and the third threshold value arbitrarily set by the user. For example, the controller 31 sets the first, second, and third threshold values according to values having been accepted based on user's operations made on the operation device 13 or values having been accepted based on user's operations made on the GUI being displayed on the screen of the display device 11 equipped with the touch panel 12. The first and second threshold values are preferably set to about a few seconds (for example, three seconds). The third threshold value is preferably set to a shorter value (for example, 1.5 seconds) than the first and second threshold values.

Figure 3A:
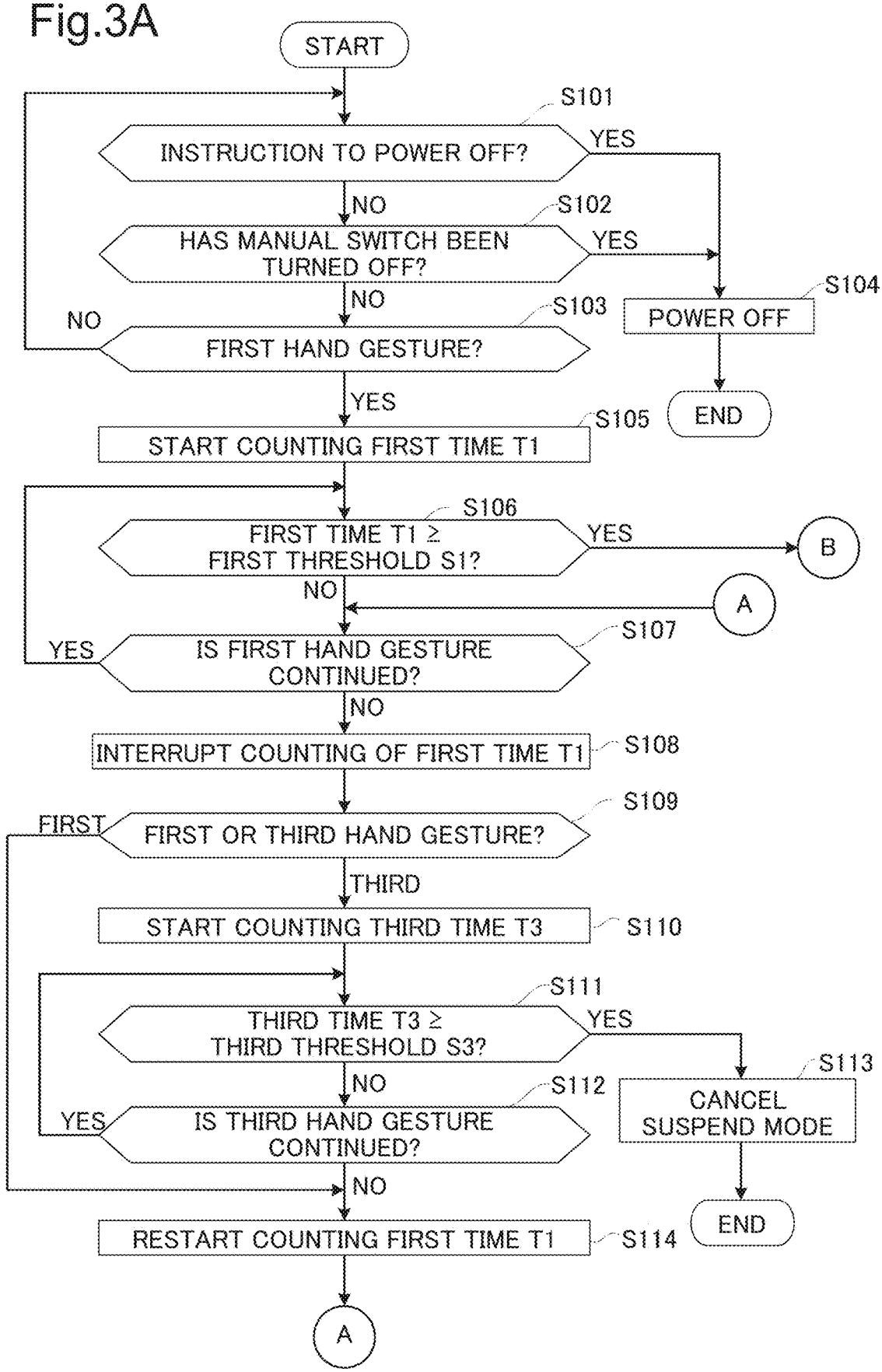
FIG. 3A is a flowchart showing power-off processing.
Figure 3B:
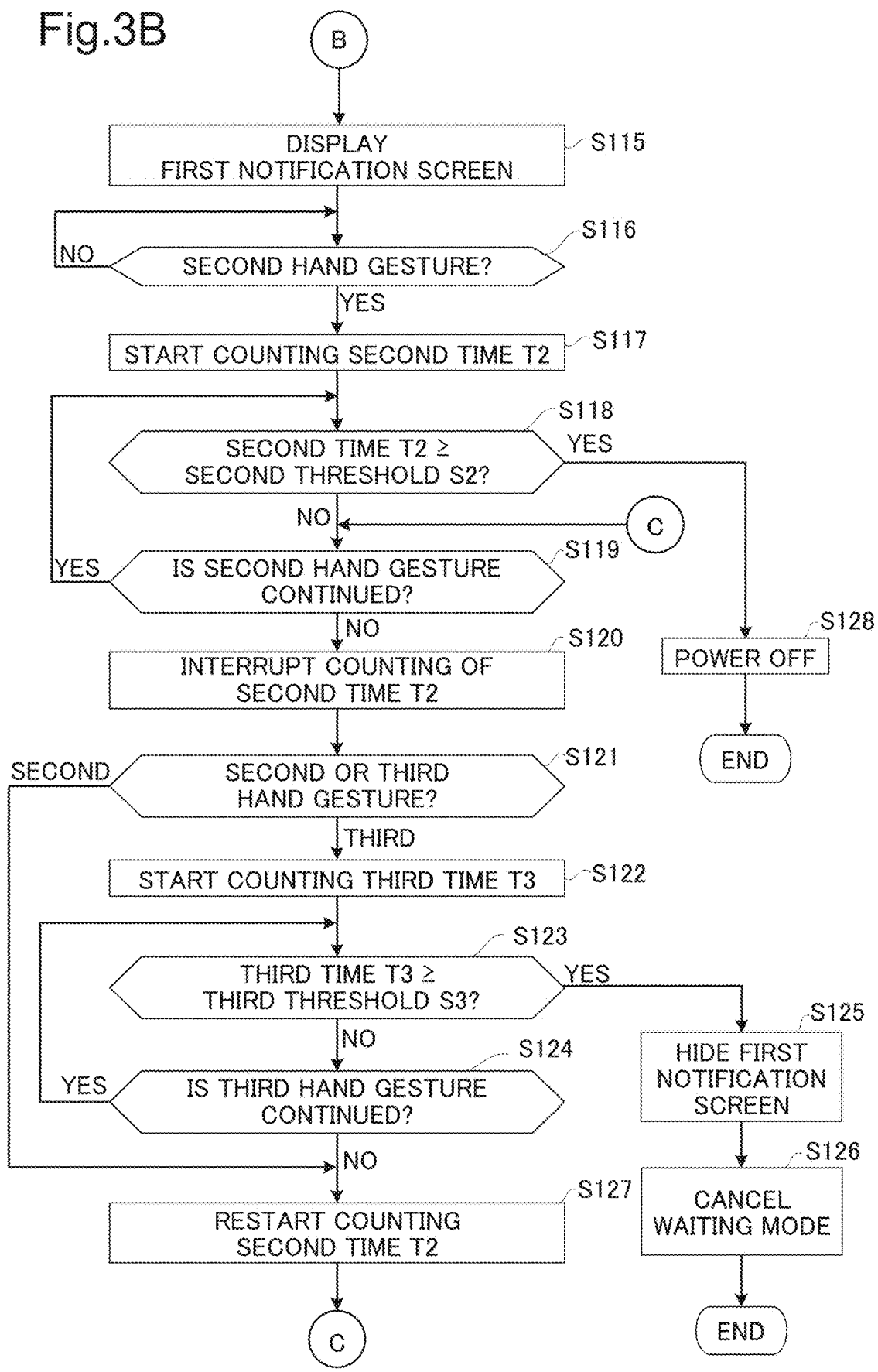
FIG. 3B is a flowchart showing processing following the processing in FIG. 3A.

Next, a detailed description will be given of power-off processing on the image forming apparatus 10 with reference to the flowcharts shown in FIGS. 3A and 3B.

When the image forming apparatus 10 is powered on and is in operation, the controller 31 determines whether or not an instruction to turn off the power based on an operation made on the GUI on the screen of the display device 11 equipped with the touch panel 12 or an instruction to turn off the power based on an operation made on the operation device 13 has been accepted (step S101). When determining that no instruction to turn off the power has been accepted (No in step S101), the controller 31 determines whether or not a manual power switch (a switch for shutting off electricity from a commercial power supply) has been turned off (step S102).

When determining that the manual power switch has not been turned off (No in step S102), the controller 31 compares data output from the gesture sensor 19 and representing a recognition result of a hand gesture with the data on each of the hand gestures stored in the storage device 18 and determines, from this comparison, whether or not the recognition result shows the first hand gesture H1 (step S103). When determining that the recognition result does not show the first hand gesture H1 (No in step S103), the controller 31 goes back to the processing in step S101.

When determining that an instruction to turn off the power has been accepted through the touch panel 12 or the operation device 13 (Yes in step S101), the controller 31 allows the power circuit 21 to turn off the power to stop the supply of operating power from the power circuit 21 to each component of the image forming apparatus 10 (step S104). When determining that the manual power switch has been turned off (Yes in step S102), power from the commercial power source is shut off, so that the supply of operating power to each component of the image forming apparatus 10 is stopped (step S104). After the processing in step S104, the controller 31 ends the power-off processing.

On the other hand, when determining that the recognition result output from the gesture sensor 19 shows the first hand gesture H1 (Yes in step S103), the controller 31 sets the image forming apparatus 10 to a suspend mode where the transition to the waiting mode is suspended, and starts counting a first time T1 (step S105). After the processing in step S105, the controller 31 determines whether or not the first time T1 has reached a predetermined first threshold value S1 (step S106). In this relation, suppose that the user makes the first hand gesture H1 shown in FIG. 2A in front of the gesture sensor 19 in order to turn off the power of the image forming apparatus 10 without touching the touch panel 12, the operation device 13, and the manual power switch.

The controller 31 determines whether or not the first hand gesture H1 is continuously detected, that is, whether or not the user continues to make the first hand gesture H1 (step S107), until the first time T1 reaches the first threshold value S1 (No in step S106). When determining that the first hand gesture H1 is continuously detected (Yes in step S107), the controller 31 goes back to the processing in step S106.

In this relation, suppose that when the image forming apparatus 10 is in a state of "No" in step S106, the user makes another hand gesture different from the first hand gesture H1. In this case, because the first hand gesture H1 has no longer been continuously detected, the controller 31 determines that the first hand gesture H1 has been interrupted (No in step S107), and temporarily interrupts the counting of the first time T1 (step S108). After the processing in step S108, the controller 31 determines which of the first hand gesture H1 and the third hand gesture H3 the recognition result of the gesture sensor 19 shows (step S109).

In this relation, suppose that the user makes the third hand gesture H3 shown in FIG. 2C in front of the gesture sensor 19 in order to cancel the suspend mode. In this case, the controller 31 determines that the recognition result of the gesture sensor 19 shows the third hand gesture H3 ("Third" in step S109), and starts counting a third time T3 (step S110). After the processing in step S110, the controller 31 determines whether or not the third time T3 has reached a predetermined third threshold value S3 (step S111).

When the third time T3 has not reached the third threshold value S3 (No in step S111), the controller 31 determines whether or not the third hand gesture H3 is continuously detected, that is, whether or not the user continues to make the third hand gesture H3 (step S112). When determining that the third hand gesture H3 is continuously detected (Yes in step S112), the controller 31 goes back to the processing in step S111.

When the third time T3 reaches the third threshold value S3 (Yes in step S111) while the third hand gesture H3 is continuously detected (Yes in step S112), the controller 31 cancels the suspend mode (step S113). After the processing in step S113, the controller 31 ends the power-off processing.

On the other hand, when determining that the third hand gesture H3 has no longer been continuously detected (No in step S112) before the third time T3 reaches the third threshold value S3 (No in step S111), the controller 31 restarts counting the first time T1 (step S114) and goes back to the processing in step S107. When going back to the processing in step S107, the controller 31 determines whether or not the first hand gesture H1 is continuously detected (step S107). When determining that the first hand gesture H1 is continued (Yes in step S107), the controller 31 goes back to the processing in step S106.

When a predetermined time (for example, 60 seconds) has passed as, in step S109, the controller 31 determines that the recognition result of the gesture sensor 19 shows neither the first hand gesture H1 nor the third hand gesture H3, the controller 31 goes back to the processing in step S101.

When in step S109 the controller 31 determines that the recognition result of the gesture sensor 19 shows the first hand gesture H1 ("First" in step S109), the controller 31 restarts counting the first time T1 (step S114) because the first hand gesture H1 has only been temporarily interrupted and has been restarted. After the processing in step S114, the controller 31 goes back to the processing in step S107.

When the first time T1 reaches the first threshold value S1 (Yes in step S106) while the first hand gesture H1 is continuously detected (Yes in step S107), the controller 31 sets the image forming apparatus 10 to the waiting mode and allows the display device 11 to display a first notification screen G showing, as shown in FIG. 4A, that the image forming apparatus 10 is in the waiting mode (step S115). At this time, the controller 31 allows the display device 11 to display on the first notification screen G, for example, a message M indicating that the second hand gesture H2 needs to be made in order to fix power-off.

Here, suppose that the user views the message M and makes the second hand gesture H2 shown in FIG. 2B in front of the gesture sensor 19. After the processing in step S115, the controller 31 determines whether or not the recognition result of the gesture sensor 19 shows the second hand gesture H2 (step S116). When determining that the recognition result shows the second hand gesture H2 (Yes in step S116), the controller 31 starts counting a second time T2 (step S117) and determines whether or not the second time T2 has reached a predetermined second threshold value S2 (step S118).

When a predetermined time (for example, 60 seconds) has passed as, in step S116, the controller 31 determines that the recognition result of the gesture sensor 19 does not show the second hand gesture H2, the controller 31 goes back to the processing in step S101.

When the second time T2 has not reached the second threshold value S2 (No in step S118), the controller 31 determines whether or not the second hand gesture H2 is continuously detected, that is, whether or not the user continues to make the second hand gesture H2 (step S119). When determining that the second hand gesture H2 is continuously detected (Yes in step S119), the controller 31 goes back to the processing in step S118.

Here, suppose that the user makes the third hand gesture H3 shown in FIG. 2C in order to cancel the waiting mode. At this time, the controller 31 determines that the second hand gesture H2 has no longer been continuously detected (No in step S119), and temporarily interrupts the counting of the second time T2 (step S120). After the processing in step S120, the controller 31 determines which of the second hand gesture H2 and the third hand gesture H3 the recognition result of the gesture sensor 19 shows (step S121). When determining that the recognition result shows the third hand gesture H3 ("Third" in step S121), the controller 31 starts counting the third time T3 (step S122). After the processing in step S122, the controller 31 determines whether or not the third time T3 has reached the predetermined third threshold value S3 (step S123).

When the third time T3 has not reached the third threshold value S3 (No in step S123), the controller 31 determines whether or not the third hand gesture H3 is continuously detected, that is, whether or not the user continues to make the third hand gesture H3 (step S124). When determining that the third hand gesture H3 is continued (Yes in step S124), the controller 31 goes back to the processing in step S123.

When the third time T3 reaches the third threshold value S3 (Yes in step S123) while the third hand gesture H3 is continuously detected (Yes in step S124), the controller 31 allows the display device 11 to hide the first notification screen G (step S125). After the processing in step S125, the controller 31 cancels the waiting mode (step S126) and ends the power-off processing.

When determining that the third hand gesture H3 has no longer been continuously detected (No in step S124) before the third time T3 reaches the third threshold value S3 (No in step S123), the controller 31 restarts counting the second time T2 (step S127) and goes back to the processing in step S119. In this case, the controller 31 determines whether or not the second hand gesture H2 is continuously detected (step S119). When determining that the second hand gesture H2 is continuously detected (Yes in step S119), the controller 31 goes back to the processing in step S118.

When in step S121 the controller 31 determines that the recognition result of the gesture sensor 19 shows the second hand gesture H2 ("Second" in step S121), the controller 31 restarts counting the second time T2 (step S127) because the second hand gesture H2 has only been temporarily interrupted and has been restarted. After the processing in step S127, the controller 31 goes back to the processing in step S119.

When the second time T2 reaches the second threshold value S2 (Yes in step S118) while the controller 31 determines that the second hand gesture H2 is continuously detected (Yes in step S119), the controller 31 allows the power circuit 21 to turn off the power to stop the supply of operating power from the power circuit 21 to each component of the image forming apparatus 10 (step S128). At this time, the controller 31 allows the display device 11 to display a second notification screen G1 as shown in FIG. 4B.

In this embodiment, when the user makes the first hand gesture H1, the controller 31 counts the first time T1 during which the first hand gesture H1 is made. When the first time T1 reaches the first threshold value S1, the controller 31 allows the display device 11 to display the first notification screen G. When the user views the message M on the first notification screen G and makes the second hand gesture H2, the controller 31 counts the second time T2 during which the second hand gesture H2 is made. When the second time T2 reaches the second threshold value S2, the controller 31 allows the power circuit 21 to turn off the power of the image forming apparatus 10.

Therefore, the user can turn off the power circuit 21 simply by hand gestures without touching the operation device 13, the touch panel 12, and the power switch, which is preferred for users who want to turn off the power in a non-contact manner from a hygienic viewpoint. In addition, since the power of the image forming apparatus 10 is turned off only when the user has made the first hand gesture H1 and the second hand gesture H2 in a preset procedure, it can be avoided that the power of the image forming apparatus 10 is carelessly turned off.

Furthermore, in this embodiment, since the suspend mode or the waiting mode of the image forming apparatus 10 can be cancelled in a non-contact manner by the third hand gesture H3, it can be more certainly avoided that the power of the image forming apparatus 10 is carelessly turned off. In addition, since the image forming apparatus 10 is in the suspend mode until it is put into the waiting mode, it can be avoided that an instruction to turn off the power based on the second hand gesture H2 is carelessly accepted. Thus, it can be still more certainly avoided that the power of the image forming apparatus 10 is carelessly turned off.

<Modifications>

Although in the above embodiment the controller 31 cancels the suspend mode or the waiting mode when the third hand gesture H3 is detected and the third time T3 reaches the third threshold value S3, the present disclosure is not limited to this manner of cancellation. In a modification, the controller 31 cancels the suspend mode or the waiting mode when a state where the first hand gesture H1 or the second hand gesture H2 is not detected is continued for a certain time. A description will be given below of the control according to this modification with reference to the flowcharts shown in FIGS. 5A and 5B. In FIGS. 5A and 5B, the same processing steps as in the processing steps shown in FIGS. 3A and 3B are designated by the same references. Further explanation of the same processing steps will be omitted.

As shown in FIG. 5A, when determining that the first hand gesture H1 has no longer been continuously detected (No in step S107), the controller 31 temporarily interrupts the counting of the first time T1 (step S108) and starts counting an interruption time T4 during which the first hand gesture H1 is not detected (step S211). The controller 31 determines whether or not the interruption time T4 has reached a predetermined fourth threshold value S4 (step S212) and determines whether or not the first hand gesture H1 has been detected again (step S213) before the interruption time T4 reaches the fourth threshold value S4 (No in step S212). When determining that the first hand gesture H1 has been detected again (Yes in step S213), the controller 31 restarts counting the first time T1 (step S214) because the first hand gesture H1 has only been temporarily interrupted and has been restarted. After the processing in step S214, the controller 31 goes back to the processing in step S107.

When determining that the interruption time T4 has reached the fourth threshold value S4 (Yes in step S212) without redetection of the first hand gesture H1 (No in step S213), the controller 31 cancels the suspend mode (step S215). After the processing in step S215, the controller 31 ends the power-off processing.

As shown in FIG. 5B, when determining that the second hand gesture H2 has no longer been detected (No in step S119), the controller 31 temporarily interrupts the counting of the second time T2 (step S120) and starts counting an interruption time T5 during which the second hand gesture H2 is interrupted (step S221). The controller 31 determines whether or not the interruption time T5 has reached a predetermined fifth threshold value S5 (step S222) and determines whether or not the second hand gesture H2 has been detected again (step S223) before the interruption time T5 reaches the fifth threshold value S5 (No in step S222). When determining that the second hand gesture H2 has been detected again (Yes in step S223), the controller 31 restarts counting the second time T2 (step S226) because the second hand gesture H2 has only been temporarily interrupted and has been restarted. After the processing in step S226, the controller 31 goes back to the processing in step S119.

When determining that the interruption time T5 has reached the fifth threshold value S5 (Yes in step S222) without redetection of the second hand gesture H2 (No in step S223), the controller 31 allows the display device 11 to hide the first notification screen G (step S224) and cancels the suspend mode (step S225). After the processing in step S225, the controller 31 ends the power-off processing.

Although in the above modification the controller 31 cancels the suspend mode when the detection of the first hand gesture H1 has been interrupted for a certain time, the present disclosure is not limited to this manner of cancellation. For example, as soon as the first hand gesture H1 has no longer been detected, the controller 31 may cancel the suspend mode without waiting for the certain time.

Although in the above modification the controller 31 cancels the waiting mode when the detection of the second hand gesture H2 has been interrupted for a certain time, the present disclosure is not limited to this manner of cancellation. For example, as soon as the second hand gesture H2 has no longer been detected, the controller 31 may cancel the waiting mode without waiting for the certain time.

Although in the above embodiment and modification a multifunction peripheral is used as the image forming apparatus according to the present disclosure, it is merely illustrative and any other image forming apparatus, such as a copier, a printer or a facsimile machine, may be used.

The structures, configurations, and processing described in the above embodiment and modification with reference to FIGS. 1 to 5B are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a display device;
   a gesture sensor that detects a gesture of a user; and
   a control device including a processor and, upon operation of the processor in accordance with a control program, functioning as a controller that,
   (i) upon detection of a predetermined first gesture by the gesture sensor, sets the image forming apparatus to a suspend mode for suspending transition to a waiting mode for waiting for acceptance of an instruction to turn off power based on a gesture and starts counting a first time,
   (ii) upon reaching of the first time to a predetermined first threshold value, sets the image forming apparatus to the waiting mode and allows the display device to display a notification indicating the waiting mode,
   (iii) upon detection of a predetermined second gesture by the gesture sensor during display of the notification on the display device, starts counting a second time, and
   (iv) upon reaching of the second time to a predetermined second threshold value, turns off the power of the image forming apparatus.

2. The image forming apparatus according to claim 1, wherein
   when the gesture sensor detects a predetermined third gesture to replace the first gesture before the first time reaches the first threshold value, the controller interrupts the counting of the first time and starts counting a third time, and
   when the third time reaches a predetermined third threshold value, the controller cancels the suspend mode.

3. The image forming apparatus according to claim 2, further comprising an operation device through which an instruction is to be input,
   wherein when accepting an instruction specifying a value for the third threshold value through the operation device, the controller changes the third threshold value to the value specified by the instruction.

4. The image forming apparatus according to claim 1, wherein
   when the gesture sensor detects a predetermined third gesture to replace the second gesture before the second time reaches the second threshold value, the controller interrupts the counting of the second time and starts counting a third time, and
   when the third time reaches a predetermined third threshold value, the controller cancels the waiting mode and allows the display device to hide the notification.

5. The image forming apparatus according to claim 1, wherein when the detection of the first gesture by the gesture sensor is interrupted before the first time reaches the first threshold value, the controller cancels the suspend mode.

6. The image forming apparatus according to claim 5, wherein when the detection of the first gesture by the gesture sensor is interrupted before the first time reaches the first threshold value, the controller starts counting an interruption time, and when the interruption time reaches a predetermined fourth threshold value, the controller cancels the suspend mode.

7. The image forming apparatus according to claim 1, wherein when the detection of the second gesture by the gesture sensor is interrupted before the second time reaches the second threshold value, the controller cancels the waiting mode.

8. The image forming apparatus according to claim 7, wherein when the detection of the second gesture by the gesture sensor is interrupted before the second time reaches the second threshold value, the controller starts counting an interruption time, and when the interruption time reaches a predetermined fifth threshold value, the controller cancels the waiting mode.

9. The image forming apparatus according to claim 1, further comprising an operation device through which an instruction is to be input, wherein when accepting an instruction specifying a value for the first threshold value or the second threshold value through the operation device, the controller changes the first threshold value or the second threshold value to the value specified by the instruction.

10. The image forming apparatus according to claim 1, further comprising an image forming device that forms an image on a recording medium.

* * * * *